(12) United States Patent
Kang

(10) Patent No.: US 12,038,863 B2
(45) Date of Patent: Jul. 16, 2024

(54) USB CHIP AND OPERATION METHOD THEREOF

(71) Applicant: REALTEK SEMICONDUCTOR CORP., Hsinchu (TW)

(72) Inventor: Nai-Yuan Kang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 30 days.

(21) Appl. No.: 18/092,680

(22) Filed: Jan. 3, 2023

(65) Prior Publication Data

US 2023/0222084 A1  Jul. 13, 2023

(30) Foreign Application Priority Data

Jan. 7, 2022 (TW) ................................ 111100849

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01); *G06F 2213/0042* (2013.01)

(58) Field of Classification Search
CPC ............. G06F 13/4282; G06F 13/4068; G06F 2213/0042
See application file for complete search history.

(56) References Cited

U.S. PATENT DOCUMENTS

| 8,390,372 B2* | 3/2013 | Buter ................. H03F 3/45475 330/9 |
| 8,624,625 B2* | 1/2014 | Shin ............... H03K 19/017545 326/86 |
| 2011/0131356 A1 | 6/2011 | Devam et al. |
| 2019/0103592 A1* | 4/2019 | Tsai ....................... B29C 33/12 |

* cited by examiner

*Primary Examiner* — Henry Tsai
*Assistant Examiner* — John B Roche
(74) *Attorney, Agent, or Firm* — Birch, Stewart, Kolasch & Birch, LLP

(57) ABSTRACT

A USB chip includes positive and negative data pins, first and second transceiver circuits, a switching circuit, and a control circuit. During a high-speed handshake stage, the control circuit controls the switching circuit to be in a second state to disconnect the positive and negative data pins from a first terminal impedance circuit and actuates the second transceiver circuit to transmit a second voltage signal via the positive and negative data pins alternately. During a high-speed transmission stage, the control circuit controls the switching circuit to be in a first state to connect the positive and negative data pins with the first terminal impedance circuit and actuates the first transceiver circuit to transmit a first voltage signal, which has a first voltage level lower than a voltage level of the second voltage signal, via the positive and negative data pins alternately.

20 Claims, 4 Drawing Sheets

USB CHIP AND OPERATION METHOD THEREOF

CROSS-REFERENCE TO RELATED APPLICATION

This non-provisional application claims priority under 35 U.S.C. § 119(a) to Patent Application No. 111100849 filed in Taiwan, R.O.C. on Jan. 7, 2022, the entire contents of which are hereby incorporated by reference.

BACKGROUND

Technical Field

The instant disclosure relates to USB (universal serial bus) technology, especially a USB chip and an operation method thereof.

Related Art

A USB (universal serial bus) interface has advantages of hot plugging and plug-and-play. A USB interface may be provided as an interface for providing or receiving electricity. As technology progresses, USB versions continue to be updated. As of the USB 2.0 version, low-speed transmission (such as 1.5 Mbps transmission speed), full-speed transmission (such as 12 Mbps transmission speed), and high-speed transmission (such as 480 Mbps transmission speed) are all supported.

Usually, when a device that can support USB 2.0 and has a USB connector is connected to another device having a USB connector, speed identification is carried out in order to determine whether to adopt low-, full-, or high-speed transmission. The method for determining whether to adopt full- or high-speed transmission is handshake using a signal (described as a handshake signal hereinafter), and a voltage level of the handshake signal should conform to a specification. Because the circuit used to generate the handshake signal (described as a handshake circuit) may have some power loss, the voltage level of the handshake signal may not conform to the specification. For example, the power loss causes the voltage level of the handshake signal to be less than the regulated voltage. As a result, an operation voltage of the handshake circuit is usually increased to compensate for power consumption.

However, increasing the operation voltage leads to increased overall power consumption of the device having a USB connector, which is not power-saving. Furthermore, in order to increase the operation voltage, additional elements (such as a low-dropout regulator, LDO) may have to be designed, and such elements would occupy the space for circuit construction of the device having a USB connector.

SUMMARY

In view of this, the instant disclosure provides a USB (universal serial bus) chip and an operation method thereof. According to some exemplary embodiments of the instant disclosure, a voltage level of a handshake signal can conform to a regulated voltage without increased operation voltage. According to some exemplary embodiments, usable space for circuit design can be increased.

According to some exemplary embodiments of the instant disclosure, the USB chip includes a positive data pin, a negative data pin, a first transceiver circuit, a second transceiver circuit, a switching circuit, and a control circuit. The first transceiver circuit is configured to transmit a first voltage signal via the positive data pin and the negative data pin alternately when the first transceiver circuit is actuated. The second transceiver circuit is configured to transmit a second voltage signal via the positive data pin and the negative data pin alternately when the second transceiver circuit is actuated. A second voltage level of the second voltage signal is greater than a first voltage level of the first voltage signal. The switching circuit is configured to connect the positive data pin and the negative data pin with a first terminal impedance circuit in a first state and to disconnect the positive data pin and the negative data pin from the first terminal impedance circuit in a second state. The control circuit is configured to control the switching circuit to be in the second state during a high-speed handshake stage, actuate the second transceiver circuit when the switching circuit is controlled to be in the second state, control the switching circuit to be in the first state during a high-speed transmission stage, and actuate the first transceiver circuit when the switching circuit is controlled to be in the first state.

According to some exemplary embodiments of the instant disclosure, the USB chip includes a positive data pin, a negative data pin, a first transceiver circuit, a second transceiver circuit, a switching circuit, and a control circuit. An operation method of the USB chip includes: controlling, through the control circuit, the switching circuit to be in a second state during a high-speed handshake stage; actuating the second transceiver circuit when the switching circuit is controlled to be in the second state; controlling the switching circuit to be in a first state through the control circuit during a high-speed transmission stage; and actuating the first transceiver circuit when the switching circuit is controlled to be in the first state. The switching circuit connects the positive data pin and the negative data pin with a first terminal impedance circuit in the first state and disconnects the positive data pin and the negative data pin from the first terminal impedance circuit in the second state. When the first transceiver circuit is actuated, the first transceiver circuit transmits a first voltage signal via the positive data pin and the negative data pin alternately; when the second transceiver circuit is actuated, the second transceiver circuit transmits a second voltage signal via the positive data pin and the negative data pin alternately, wherein a second voltage level of the second voltage signal is greater than a first voltage level of the first voltage signal.

To summarize the above, according to some exemplary embodiments of the instant disclosure, through the two transceiver circuits respectively transmitting signals having different voltage levels, the voltage level of the handshake signal during the high-speed handshake stage can conform to a regulated voltage without increased operation voltage, and the voltage level of a signal during high-speed transmission stage (described as a post-handshake signal hereinafter) can also conform to a regulated voltage without increased operation voltage. In some exemplary embodiments, because additional elements (such as a low-dropout regulator) for increasing the operation voltage are not necessarily required, usable space for circuit design can be increased. For example, according to some exemplary embodiments of this instant disclosure, not only the overall power consumption of the USB chip can be reduced, but also the usable space for circuit design can be increased.

BRIEF DESCRIPTION OF THE DRAWINGS

The disclosure will become more fully understood from the detailed description given herein below for illustration only, and thus not limitative of the disclosure, wherein.

DETAILED DESCRIPTION

The terms such as "first" and "second" are used to differentiate one element from another and not meant for sequencing the elements or limiting the differences among the elements. As a result, the abovementioned terms cannot be used to limit the scope of the instant disclosure. Besides, the term "connect" may refer to the act of physically or electrically connecting two or more elements with each other in a direct manner, or the term "connect" may refer to the act of physically or electrically connecting two or more elements with each other in an indirect manner. For example, if a first device is connected to a second device, the first device may be directly and electrically connected to the second device, or the first device may be indirectly and electrically connected to the second device via some other device(s) or through other connection manners.

Figure 1:
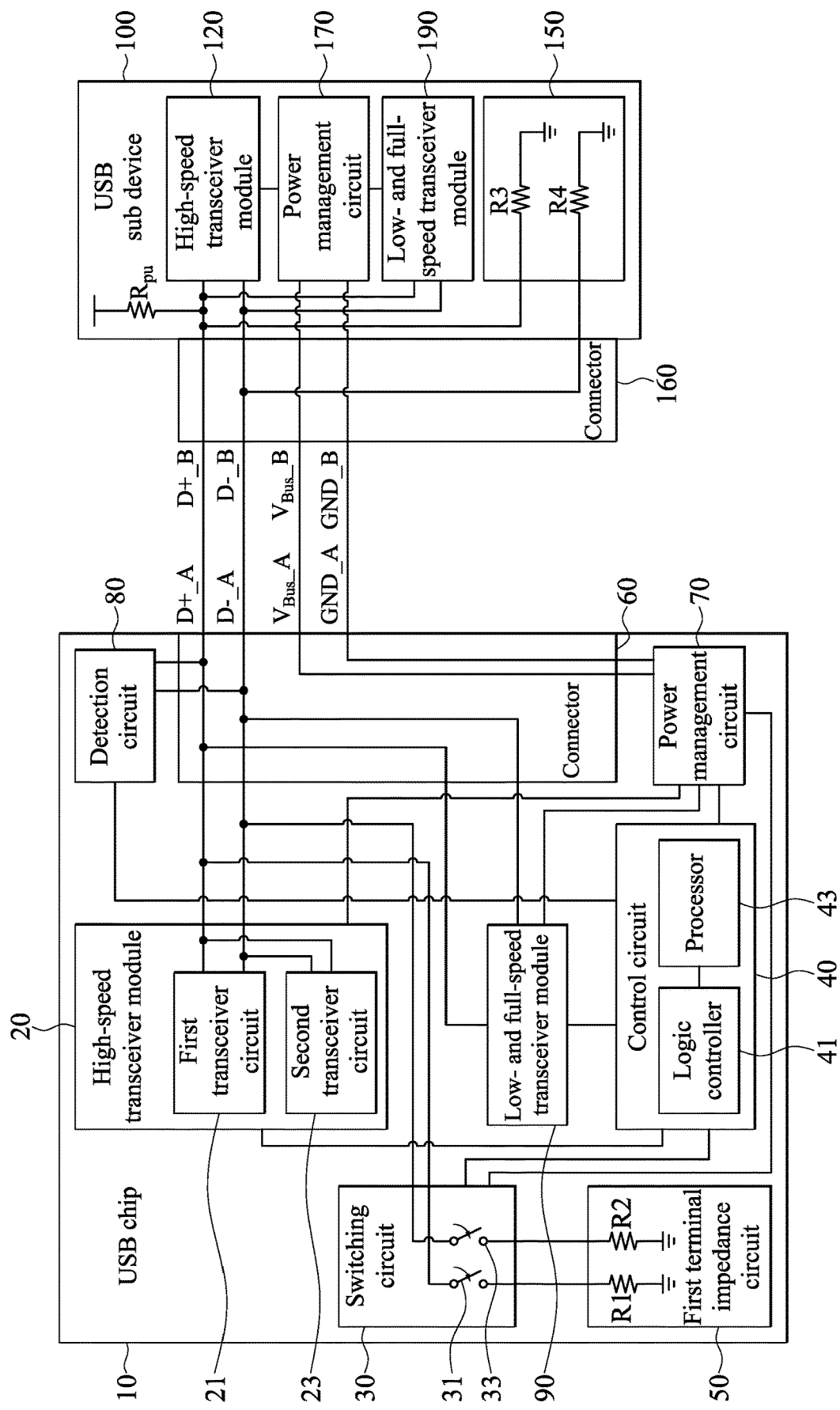
FIG. 1 illustrates a block application diagram of a USB (universal serial bus) chip connected to a USB sub device according to some exemplary embodiments of the instant disclosure.

FIG. 1 illustrates a block application diagram of a USB (universal serial bus) chip 10 connected to a USB sub device 100 according to some exemplary embodiments of the instant disclosure. Please refer to FIG. 1. The USB chip 10 comprises a positive data pin D+_A, a negative data pin D−_A, a first transceiver circuit 21, a second transceiver circuit 23, a switching circuit 30, and a control circuit 40. The positive data pin D+_A and the negative data pin D−_A are both connected to the first transceiver circuit 21 and the second transceiver circuit 23. That is, in this embodiment, the positive data pin D+_A is connected to the first transceiver circuit 21 and the second transceiver circuit 23, and the negative data pin D−_A is connected to the first transceiver circuit 21 and the second transceiver circuit 23. The switching circuit 30 is connected to the positive data pin D+_A, the negative data pin D−_A, and a first terminal impedance circuit 50. The control circuit 40 is connected to the first transceiver circuit 21, the second transceiver circuit 23, and the switching circuit 30.

In some exemplary embodiments of the instant closure, the positive data pin D+_A and the negative data pin D−_A may be implemented using a USB connector (described as a connector 60 hereinafter). In some exemplary embodiments, the USB chip 10 may be implemented by using a USB main device and can be connected to a USB sub device 100. The USB main device may be an electronic device having a USB female connector (or a type-C female connector) such as a computer, a mobile device, a digital television (such as a set-top box), or a USB hub. The USB sub device 100 may be an electronic device having a USB male connector (or a type-C male connector) such as a computer, a mobile device, photographic equipment, a digital television (such as a set-top box), or a gaming console.

For illustrative purposes, the USB main device will be described as the USB chip 10 hereinafter.

A version of the connector 60 of the USB chip 10 corresponds to a version of a connector 160 of the USB sub device 100, and the connector 60 is connected to the connector 160. For example, according to the definition of the version of the USB shown in FIG. 1 (USB 2.0 for example), the positive data pin D+_A of the connector 60 is connected to a positive data pin D+_B of the connector 160, the negative data pin D−_A of the connector 60 is connected to a negative data pin D−_B of the connector 160, a voltage conversion pin $V_{Bus}$_A of the connector 60 is connected to a voltage conversion pin $V_{Bus}$_B of the connector 160, and a ground pin GND_A of the connector 60 is connected to a ground pin GND_B of the connector 160. The voltage conversion pin $V_{Bus}$_A is configured to supply power from the USB chip 10 to the USB sub device 100. For example, the voltage conversion pin $V_{Bus}$_A supplies a 5V voltage from a power management circuit 70 of the USB chip 10 to a power management circuit 170 of the USB sub device 100.

The power management circuit 70 of the USB chip 10 has a power source to supply an operation voltage to the elements of the USB chip 10 (such as the first transceiver circuit 21, the second transceiver circuit 23, the switching circuit 30, and the control circuit 40). Similarly, the power management circuit 170 of the USB sub device 100 is configured to supply electricity to the elements of the USB sub device 100 so as to allow the operation of the elements of the USB sub device 100. In some exemplary embodiments, the USB sub device 100 may acquire power from the USB chip 10 or other sources. For example, the USB sub device 100 may be designed to have a built-in power source or connected to an external power source via a power adaptor. The ground pin GND_A is configured to provide the power management circuit 170 of the USB sub device 100 with a ground potential from the power management circuit 70 of the USB chip 10, thereby allowing the USB sub device 100 to have a ground potential. The ground pin GND_A acquires the ground potential from a ground of the power management circuit 70. The ground of the power management circuit 70 is configured to provide the USB chip 10 with a ground potential.

In some exemplary embodiments of the instant disclosure, according to a supported USB version of the USB chip 10, the USB chip 10 may support multiple transmission modes to support various transmission speeds. For example, if the USB chip 10 supports USB 2.0, the USB chip 10 can support a low-speed transmission mode, a full-speed transmission mode, and a high-speed transmission mode so as to support a low-speed transmission, a full-speed transmission, and a high-speed transmission. When the USB chip 10 is connected to the USB sub device 100, the USB chip 10 determines which transmission modes are supported by the USB chip 10 and the USB sub device 100 respectively so as to conduct the transmission at a transmission speed supported by both the USB chip 10 and the USB sub device 100.

For example, as shown in FIG. 1, the USB chip 10 has a low- and full-speed transceiver module 90 and a high-speed transceiver module 20. The USB sub device 100 has a low- and full-speed transceiver module 190 and a high-speed transceiver module 120. The low- and full-speed transceiver module 90 provides the USB chip 10 with the low-speed transmission and the full-speed transmission, and the low- and full-speed transceiver module 190 provides the USB sub device 100 with the low-speed transmission and the full-speed transmission. The high-speed transceiver module 20 provides the USB chip 10 with the high-speed transmission, and the high-speed transceiver module 120 provides the USB sub device 100 with the high-speed transmission. In this embodiment, the high-speed transceiver module 20 may be implemented by using the first transceiver circuit 21 and the second transceiver circuit 23.

In some exemplary embodiments of the instant disclosure, when the USB chip 10 detects a high voltage level at the negative data pin D−_A, the USB chip 10 determines that the USB sub device 100 is in the low-speed transmission mode, and thus the USB chip 10 and the USB sub device 100 conduct the low-speed transmission. When the USB chip 10 detects a high voltage level at the positive data pin D+_A, a handshake process is then conducted (illustrated later in the instant disclosure). Through the handshake process, whether the USB chip 10 and the USB sub device 100 can support the high-speed transmission mode can be determined. If both the USB chip 10 and the USB sub device 100 can support the high-speed transmission mode, the USB chip 10 and the USB sub device 100 conduct the high-speed transmission. If either or both the USB chip 10 and the USB sub device 100 cannot support the high-speed transmission mode, the USB chip 10 and the USB sub device 100 conduct the full-speed transmission.

To be specific, in this embodiment, when a pull-up resistor $R_{pu}$ of the USB sub device 100 is connected to the negative data pin D−_B of the USB sub device 100, the USB sub device 100 is in the low-speed transmission mode, and voltages of the negative data pin D−_B and the negative data pin D−_A are pulled up to the high voltage level (such as 3.3 V). When the pull-up resistor $R_{pu}$ of the USB sub device 100 is connected to the positive data pin D+_B of the USB sub device 100 (as shown in FIG. 1), the voltages of the positive data pin D+_B and the positive data pin D+_A are pulled up to the high voltage level (such as 3.3 V), meaning that the USB sub device 100 is not in the low-speed transmission mode. As a result, in this situation, the USB chip 10 has to further perform the handshake process to determine whether the transmission mode between the USB chip 10 and the USB sub device 100 is the full-speed transmission mode or the high-speed transmission mode.

Figure 2:
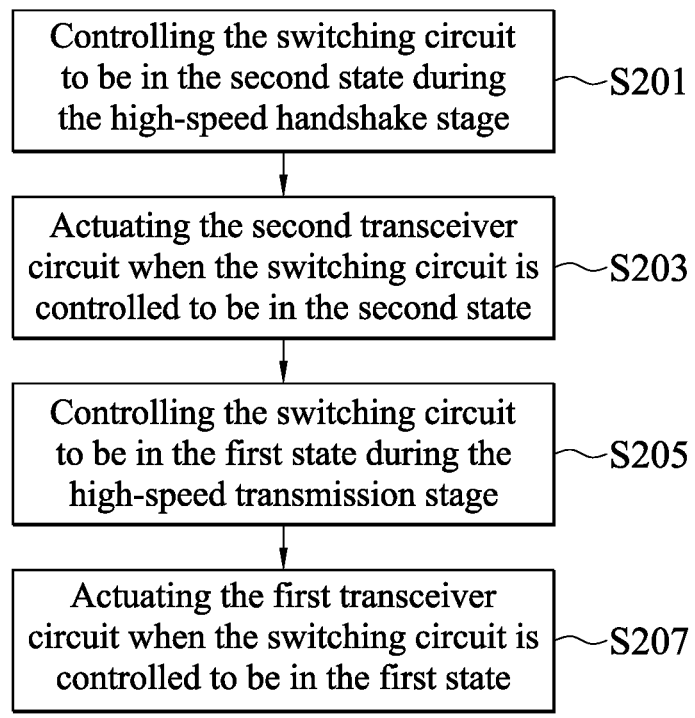
FIG. 2 illustrates a flowchart of an operation method of a USB chip according to some exemplary embodiments of the instant disclosure.

FIG. 2 illustrates a flowchart of an operation method of the USB chip 10 according to some exemplary embodiment of the instant disclosure. In some exemplary embodiments, the operation method is adapted to be executed by the control circuit 40. First, during a high-speed handshake stage of the handshake process, the control circuit 40 controls the switching circuit 30 to be in a second state (step S201). When the switching circuit 30 is controlled to be in the second state, the control circuit 40 actuates the second transceiver circuit 23 (step S203) to start the operation of the second transceiver circuit 23. During a high-speed transmission stage of the handshake process, the control circuit 40 controls the switching circuit 30 to be in a first state (step S205). When the switching circuit 30 is controlled to be in the first state, the control circuit actuates the first transceiver circuit 21 (step S207) to start the operation of the first transceiver circuit 21. In some exemplary embodiments, entering the high-speed transmission stage of the handshake process indicates that both the USB chip 10 and the USB sub device 100 can support the high-speed transmission mode, and, after the handshake process between the USB chip 10 and the USB sub device 100 is successful, the high-speed transmission may be initiated, and the handshake process will end.

Please refer to FIG. 1. The switching circuit 30 connects the positive data pin D+_A and the negative data pin D−_A with a first terminal impedance circuit 50 in a first state. In other words, in this embodiment, in the first state, the switching circuit 30 connects the positive data pin D+_A with the first terminal impedance circuit 50, and the switching circuit 30 connects the negative data pin D−_A with the first terminal impedance circuit 50. The first transceiver circuit 21 transmits a first voltage signal (i.e., the post-handshake signal) via the positive data pin D+_A and the negative data pin D−_A alternately when the first transceiver circuit 21 is actuated. The switching circuit 30 disconnects the positive data pin D+_A and the negative data pin D−_A from the first terminal impedance circuit 50 in a second state. In other words, in this embodiment, in the second state, the switching circuit 30 disconnects the positive data pin D+_A from the first terminal impedance circuit 50, and the switching circuit 30 disconnects the negative data pin D−_A from the first terminal impedance circuit 50. The second transceiver circuit 23 transmits a second voltage signal (i.e., the handshake signal) via the positive data pin D+_A and the negative data pin D−_A alternately when the second transceiver circuit 23 is actuated.

Compared with the first voltage signal, which is generated on the condition that both the connection between the first terminal impedance circuit 50 and the positive data pin D+_A and the connection between the first terminal impedance circuit 50 and the negative data pin D−_A are established, the second voltage signal is generated on the condition that the first terminal impedance circuit 50 is disconnected from the positive data pin D+_A, and the first terminal impedance circuit 50 is disconnected from the negative data pin D−_A. Besides, compared with a headroom of the second transceiver circuit 23, the headroom of the first transceiver circuit 21 is less sufficient. As a result, a second voltage level of the second voltage signal is greater than a first voltage level of the first voltage signal. Through the two transceiver circuits (i.e., the first transceiver circuit 21 and the second transceiver circuit 23) transmitting signals having different voltage levels, the voltage level of the handshake signal in the high-speed handshake stage can conform to a regulated voltage without increased operation voltage, and the voltage level of the post-handshake signal in the high-speed transmission stage can also conform to a regulated voltage. The regulated voltage of the handshake signal is 0.8 V, and the regulated voltage of the post-handshake signal is 0.4 V.

In some exemplary embodiments, when the switching circuit 30 is controlled to be in the first state, the control circuit 40 also disables the second transceiver circuit 23; when the switching circuit 30 is controlled to be in the second state, the control circuit 40 also disables the first transceiver circuit 21. In other words, in these embodiments, only the second transceiver circuit 23 is actuated and in operation during the high-speed handshake stage, and only the first transceiver circuit 21 is actuated and in operation during the high-speed transmission stage. As a result, the first transceiver circuit 21 and the second transceiver circuit 23 do not interfere with each other, and the first voltage signal and the second voltage signal do not interfere with each other.

Please refer to FIG. 1. In some exemplary embodiments, the switching circuit 30 comprises a first switch 31 and a second switch 33. The first switch 31 and the second switch 33 may be implemented by using electrical switches (such as transistors). In some exemplary embodiments, the first terminal impedance circuit 50 comprises a first terminal impedance R1 and a second terminal impedance R2. The first terminal impedance R1 and the second terminal impedance R2 may be formed by passive elements (such as resistors, capacitors, and inductors). Preferably, in some embodiments, the first terminal impedance R1 and the second terminal impedance R2 are both implemented by using resistors. For example, the first terminal impedance R1 and the second terminal impedance R2 are both 45Ω resistors. The first switch 31 is connected between the positive data pin D+_A and the first terminal impedance R1, and the second switch 33 is connected between the negative data pin D−_A and the second terminal impedance R2. In some exemplary embodiments, in the first state, the first switch 31 connects the positive data pin D+_A with the first terminal impedance R1, and the second switch 33 connects the negative data pin D−_A with the second terminal impedance R2. In the second state, the first switch 31 disconnects the positive data pin D+_A from the first terminal impedance R1, and the second switch 33 disconnects the negative data pin D−_A from the second terminal impedance R2.

Please refer to FIG. 1. In some exemplary embodiments of the instant disclosure, the control circuit 40 comprises a logic controller 41. The logic controller 41 may be a programmable logic controller (PLC). The switching between states of the switching circuit 30 is controlled by the logic controller 41, and the first transceiver circuit 21 and the second transceiver circuit 23 are actuated by the logic controller 41. For example, during the high-speed handshake stage, the logic controller 41 transmits a high-level switching signal (such as a logic level "1"). The switching circuit 30 is switched from the first state to the second state in response to the high-level switching signal, and the logic controller 41 transmits an actuation signal to the second transceiver circuit 23 to actuate the second transceiver circuit 23. During the high-speed transmission stage, the logic controller 41 transmits a low-level switching signal (such as a logic level "0"). The switching circuit 30 is switched from the second state to the first state in response to the low-level switching signal, and the logic controller 41 transmits an actuation signal to the first transceiver circuit 21 to actuate the first transceiver circuit 21.

Figure 3:
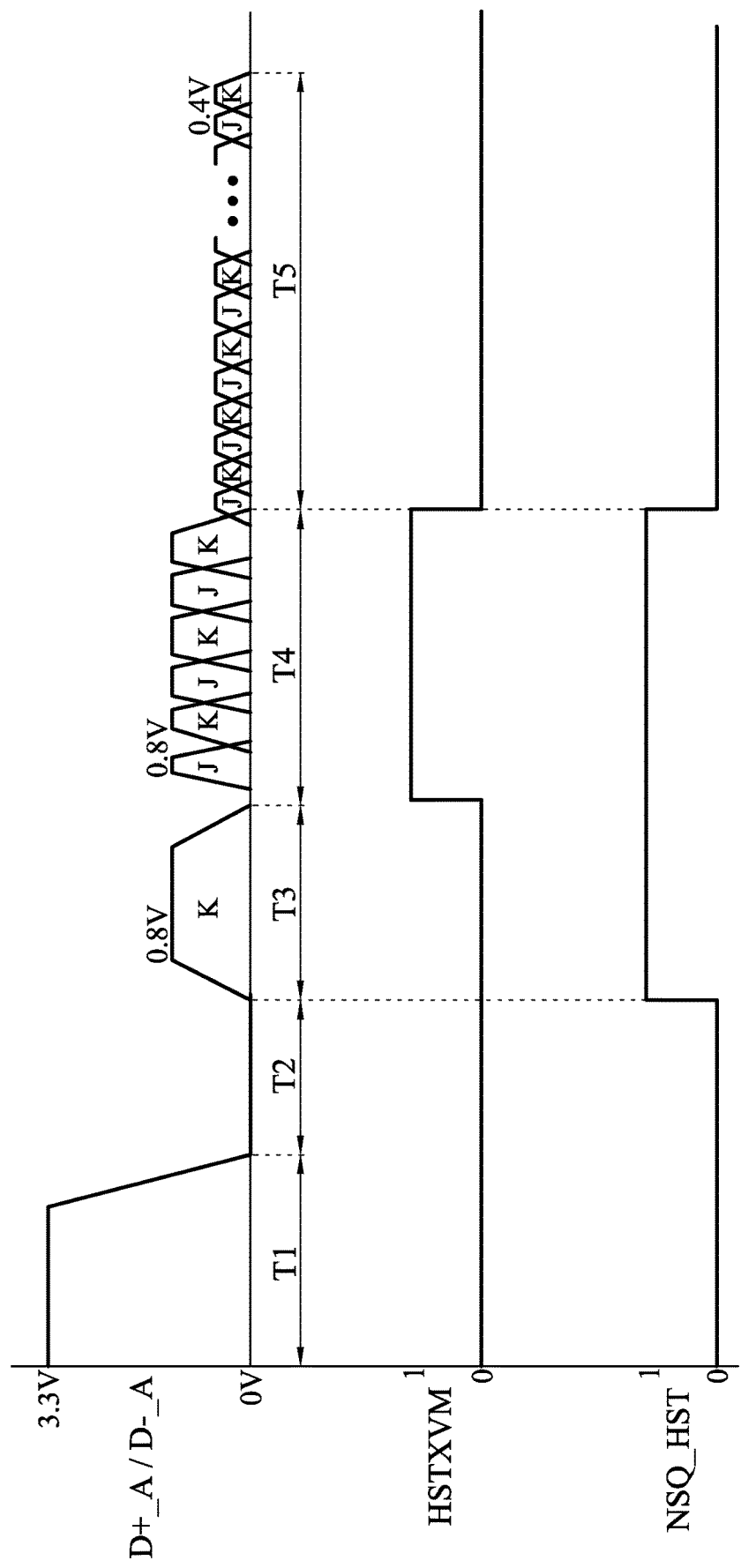
FIG. 3 illustrates signal sequence diagrams of a handshake process according to some exemplary embodiments of the instant disclosure.

FIG. 3 illustrates signal sequence diagrams of a handshake process according to some exemplary embodiment of the instant disclosure. Please refer to FIG. 3. First, when the USB chip 10 is connected to the USB sub device 100, and the voltages of the positive data pin D+_B and the positive data pin D+_A are pulled up to the high voltage level (such as 3.3 V, as shown in a time period T1 in FIG. 3), the USB chip 10 initiates the handshake process. In this embodiment, because the positive data pin D+_A is connected to the positive data pin D+_B, and the negative data pin D−_A is connected to the negative data pin D−_B, an identical voltage level exists at the positive data pin D+_A and the positive data pin D+_B, and another identical voltage level exists at the negative data pin D−_A and the negative data pin D−_B. For illustrative purposes, FIG. 3 only shows the signal sequences of the signals on the positive data pin D+_A and the negative data pin D−_A.

Next, the control circuit 40 of the USB chip 10 generates a reset signal and resets the positive data pin D+_A and the negative data pin D−_A to the low voltage level (such as 0 V or substantial 0 V, as shown in a time period T2 shown in FIG. 3) in response to the reset signal. In some exemplary embodiments, a duration when the positive data pin D+_A and the negative data pin D−_A are reset to the low voltage level (i.e., the time period T2) is not less than 10 ms. In some exemplary embodiments, as shown in FIG. 1, the control circuit 40 comprises a processor 43. The processor 43 is configured to generate the reset signal when the handshake process is initiated. The processor 43 may be a central processing unit. In some exemplary embodiments, when the positive data pin D+_A and the negative data pin D−_A are reset to the low voltage level (i.e., during the time period T2), the switching circuit 30 is in the first state. In other words, in these embodiments, during the time period T2, the positive data pin D+_A is connected to the first terminal impedance circuit 50, and the negative data pin D−_A is connected to the first terminal impedance circuit 50.

After the positive data pin D+_A and the negative data pin D−_A are reset to the low voltage level, if the USB sub device 100 can support the high-speed transmission mode, the USB sub device 100 inputs a current (such as 17.78 mA) into the negative data pin D−_B and the negative data pin D−_A via an internal current source (not shown in the figures). Because the pull-up resistor $R_{pu}$ is not disconnected from the positive data pin D+_B, the current results in a third voltage signal at the negative data pin D−_A due to the first terminal impedance circuit 50. In other words, the third voltage signal is generated by the USB sub device 100, where the duration of the third voltage signal is 1-7 ms (as shown in a time period T3 in FIG. 3), and the voltage level of the third voltage signal is 0.8 V. In some exemplary embodiments, the third voltage signal is implemented by generating a chirped state-K signal of the USB sub device 100 (described as a first chirped state-K signal hereinafter). The first chirped state-K signal refers to the state where the positive data pin D+_A and the negative data pin D−_A are in a state K, or the positive data pin D+_B and the negative data pin D−_B are in the state K. The state K refers to when the positive data pin D+_A is at the low voltage level (such as 0 V or substantial 0 V) and the negative data pin D−_A is at the high voltage level (such as greater than 0 V), or when the positive data pin D+_B is at the low voltage level and the negative data pin D−_B is at the high voltage level. In some exemplary embodiments, when the third voltage signal is generated (i.e., during the time period T3), the switching circuit 30 is in the first state.

In some exemplary embodiments, after the positive data pin D+_A and the negative data pin D−_A are reset to the low voltage level (i.e., during the time period T2), if the USB sub device 100 cannot support the high-speed transmission mode, the USB sub device 100 does not generate the third voltage signal. If the USB chip 10 does not detect the third voltage signal, the USB chip 10 will continue operations related to the time period T2 until the handshake process ends, and after the handshake process ends, the USB chip 10 and the USB sub device 100 conduct the full-speed transmission. Similarly, in some exemplary embodiments, if the USB chip 10 cannot support the high-speed transmission mode, the USB chip 10 ignores the third voltage signal from the USB sub device 100 and continues operations related to the time period T2 until the handshake process ends, and after the handshake process ends, the USB chip 10 and the USB sub device 100 conduct the full-speed transmission.

In some exemplary embodiments, as shown in FIG. 3, during the handshake process (such as after the time period T3), the control circuit 40 generates a switching stage signal HSTXVM so as to determine whether the control circuit is in the high-speed handshake stage or the high-speed transmission stage.

In some exemplary embodiments, when the third voltage signal from the USB sub device 100 exists at the negative data pin D−_A, the control circuit 40 generates a switching stage signal indicating the high-speed handshake stage and operates in the high-speed handshake stage. For example, as shown in FIG. 1 and FIG. 3, when the processor 43 detects the third voltage signal and the USB chip 10 can support the high-speed transmission mode, the control circuit 40 generates the switching stage signal HSTXVM indicating the high-speed handshake stage T4 to the logic controller 41. The logic controller 41 then operates in the high-speed handshake stage T4 in response to the switching stage signal HSTXVM indicating the high-speed handshake stage T4. The switching stage signal HSTXVM may be a high level (such as a logic level "1") to indicate the high-speed handshake stage T4.

In some exemplary embodiments, on the condition that the USB chip 10 can support the high-speed transmission, when the control circuit 40 detects that a duration time of the third voltage signal (i.e., time period T3) is less than a time threshold, the control circuit 40 generates the switching stage signal HSTXVM indicating the high-speed handshake stage T4. The time threshold may be 100 μs or conform to a USB 2.0 specification. The time threshold may be pre-saved in the processor 43 or inputted into the processor 43.

In some exemplary embodiments, as shown in FIG. 3, after entering the high-speed handshake stage T4, the second transceiver circuit 23 transmits a second voltage signal via the positive data pin D+_A and the negative data pin D−_A alternately. In some exemplary embodiments, the second voltage level of the second voltage signal is 0.8 V. In some exemplary embodiments, the second voltage signal transmitted via the negative data pin D−_A is implemented by generating a chirped state-K signal of the second transceiver circuit 23 (described as a second chirped state-K signal hereinafter), and the second voltage signal transmitted via the positive data pin D+_A is implemented by generating a chirped state-J signal of the second transceiver circuit 23 (described as a second chirped state-J signal hereinafter). In other words, in these embodiments, during the high-speed handshake stage T4, the second transceiver circuit 23 transmits a signal sequence formed by alternating between the second chirped state-J signal and the second chirped state-K signal. For example, the signal sequence may be "the second chirped state-J signal, the second chirped state-K signal, the second chirped state-J signal, the second chirped state-K signal, and so on." The second chirped state-K signal of the second transceiver circuit 23 is similar to the first chirped state-K signal of the USB sub device 100 and thus is not repeatedly described here. The second chirped state-J signal refers to the state where the positive data pin D+_A and the negative data pin D−_A are in a state J, or when the positive data pin D+_B and the negative data pin D−_B are in the state J. The state J refers to when the positive data pin D+_A is at the high voltage level (such as greater than 0 V) and the negative data pin D−_A is at the low voltage level (such as 0 V or substantial 0 V), or when the positive data pin D+_B is at the high voltage level and the negative data pin D−_B is at the low voltage level.

In some exemplary embodiments, during the high-speed handshake stage, when a number of times of the second voltage signal being transmitted via the positive data pin D+_A is not less than a threshold of the number of times, and the number of times of the second voltage signal being transmitted via the negative data pin D−_A is not less than the threshold of the number of times, the control circuit 40 generates the switching stage signal HSTXVM indicating the high-speed transmission stage T5 and operates in the high-speed transmission stage T5. Here, as an example for description, the signal transmitted at the negative data pin D−_A is the second chirped state-K signal, and the signal transmitted at the positive data pin D+_A is the second chirped state-J signal. As shown in FIG. 1 and FIG. 3, during the high-speed handshake stage T4, the processor 43 accumulates the number of times of the second chirped state-J signal being transmitted and the number of times of the second chirped state-K signal being transmitted. For example, if the number of times of the second chirped state-J signal being transmitted is less than the threshold of the number of times, and the number of times of the second chirped state-K signal being transmitted is less than the threshold of the number of times, the processor 43 generates a switching stage signal HSTXVM indicating the high-speed transmission stage T5 to the logic controller 41. The logic controller 41 then operates in the high-speed transmission stage T5 in response to the switching stage signal HSTXVM indicating the high-speed transmission stage T5. The switching stage signal HSTXVM may be a low level (such as a logic level "0") to indicate the high-speed transmission stage T5. In some exemplary embodiments, the threshold of the number of times may be 3 or conform to a USB 2.0 specification. The threshold of the number of times may be pre-saved in the processor 43 or inputted into the processor 43.

In some exemplary embodiments, only on the condition that an accumulated number of times of the second chirped state-J signal being transmitted (described as a first number of times hereinafter) and an accumulated number of times of the second chirped state-K signal being transmitted (described as a second number of times hereinafter) are identical (i.e., when the first number of times is identical to the second number of times), the processor 43 compares the first number of times or the second number of times with the threshold of the number of times to determine whether both the first number of times and the second number of times are not less than the threshold of the number of times. For example, if the threshold of the number of times is 8, then the processor 43 determines whether one of the first number of times and the second number of times is not less than 8 or both the first number of times and the second number of times are not less than 8. In some exemplary embodiments, the processor 43 may compare the summation of the first number of times and the second number of times with the threshold of the number of times to determine whether the summation of the first number of times and the second number of times is not less than the threshold of the number of times. For example, if the threshold of the number of times is 8, the processor 43 first doubles the threshold of the number of times as a threshold of the number of times for comparison and then determines whether the summation of the first number of times and the second number of times is not less than the threshold of the number of times for comparison (i.e., whether the summation of the first number of times and the second number of times is not less than 16).

In some exemplary embodiments, as shown in FIG. 3, after entering the high-speed transmission stage T5, the first transceiver circuit 21 transmits a first voltage signal via the positive data pin D+_A and the negative data pin D−_A alternately. In some exemplary embodiments, the first voltage level of the first voltage signal is 0.4 V. In some exemplary embodiments, the first voltage signal transmitted via the negative data pin D−_A is implemented by generating a chirped state-K signal of the first transceiver circuit 21 (described as a third chirped state-K signal hereinafter), and the first voltage signal transmitted via the positive data pin D+_A is implemented by generating a chirped state-J signal of the first transceiver circuit 21 (described as a third chirped state-J signal hereinafter). In other words, in these embodiments, during the high-speed transmission stage T5, the first transceiver circuit 21 transmits a signal sequence formed by alternating between the third chirped state-J signal and the third chirped state-K signal. For example, the sequence may be "the third chirped state-J signal, the third chirped state-K signal, the third chirped state-J signal, the third chirped state-K signal, and so on." The difference between the third chirped state-K signal of the first transceiver circuit 21 and the second chirped state-K signal of the second transceiver circuit 23 is that, the voltage level of the third chirped state-K signal of the first transceiver circuit 21 is 0.4 V, while the voltage level of the second chirped state-K signal of the second transceiver circuit 23 is 0.8 V. The difference between the third chirped state-J signal of the first transceiver circuit 21 and the second chirped state-J signal of the second transceiver circuit 23 is that, the voltage level of the third chirped state-J signal of the first transceiver circuit 21 is 0.4 V, while the voltage level of the second chirped state-J signal of the second transceiver circuit 23 is 0.8 V.

In some exemplary embodiments, as shown in FIG. 1, the USB chip 10 further comprises a detection circuit 80. The detection circuit 80 is connected to the control circuit 40, the positive data pin D+_A, and the negative date pin D−_A. The detection circuit 80 is configured to detect the voltage level at the positive data pin D+_A and the voltage level at the negative data pin D−_A. As shown in FIG. 3, after the positive data pin D+_A and the negative data pin D−_A are reset to the low voltage level (i.e., during the time period T2), when the voltage level at the positive data pin D+_A and the voltage level at the negative data pin D−_A are greater than a voltage threshold, the detection circuit 80 generates a detection signal NSQ_HST having a high level (such as a logic level "1"); when the voltage level at the positive data pin D+_A and the voltage level at the negative data pin D−_A are not greater than the voltage threshold, the detection circuit 80 generates a detection signal NSQ_HST having a low level (such as a logic level "0"). Based on the level of the detection signal NSQ_HST, the control circuit 40 can determine in which stage (time period) of the handshake process the control circuit 40 is, which stage (time period) of the handshake process the control circuit 40 is entering, or whether the USB chip 10 is disconnected from the USB sub device 100. In some exemplary embodiments, the voltage threshold may be 0.6 V. Preferably, in some embodiments, the voltage threshold may be 0.585 V.

For example, as shown in FIG. 3, during the high-speed handshake stage T4, the detection circuit 80 detects the second voltage level of the second voltage signal at the positive data pin D+_A and the second voltage level of the second voltage signal at the negative data pin D−_A. When the second voltage level is not greater than the voltage threshold, the detection circuit 80 generates a detection signal NSQ_HST having a low level to indicate that the USB sub device 100 can support the high-speed transmission mode and that the handshake process is successful, and thus the USB chip 10 can enter the high-speed transmission stage T5. The controller circuit 40 then generates a switching stage signal HSTXVM indicating the high-speed transmission stage T5 and operates in the high-speed transmission stage T5 in response to the detection signal NSQ_HST having a low level. For example, the processor 43 generates a switching stage signal HSTXVM indicating the high-speed transmission stage T5 in response to the detection signal NSQ_HST having a low level, so that the logic controller 41 operates in the high-speed transmission stage T5.

It is understood that, the USB 2.0 specification only specified that, after 3 sets of sequences formed by the chirped state-J signal and the chirped state-K signal appear (i.e., after both the chirped state-J signal and the chirped state-K signal appear three times) during the high-speed handshake stage T4, the control circuit 40 should enter the high-speed transmission stage T5 within 500 μs. As a result, on the condition that the specification is conformed to, beside by using the processor 43 to determine whether the number of times of the second voltage signal being transmitted via the positive data pin D+_A and the number of times of the second voltage signal being transmitted via the negative data pin D−_A are not less than the threshold of the number of times, whether the control circuit 40 enters the high-speed transmission stage T5 can also be determined by using the detection circuit 80 to detect the second voltage level of the second voltage signal.

In some exemplary embodiments, during the high-speed handshake stage T4, when the control circuit 40 is about to enter the high-speed transmission stage T5, the second voltage level of the second voltage signal at the positive data pin D+_A and the second voltage level of the second voltage signal at the negative data pin D−_A are pulled down to be not greater than the voltage threshold by the second terminal impedance circuit 150. Specifically, in these embodiments, as shown in FIG. 1, when the USB sub device 100 can support the high-speed transmission mode and the handshake process was successful, the USB sub device 100 disconnects the pull-up resistor $R_{pu}$ from the positive data pin D+_A, and the second terminal impedance circuit 150 of the USB sub device 100 is connected to the positive data pin D+_A of the USB chip 10 via the positive data pin D+_B, and the second terminal impedance circuit 150 of the USB sub device 100 is connected to the negative data pin D−_A of the USB chip 10 via the negative data pin D−_B. As a result, the second voltage level of the second voltage signal at the positive data pin D+_A and the second voltage level of the second voltage signal at the negative data pin D−_A are pulled down to be not greater than the voltage threshold by the second terminal impedance circuit 150. For example, the second voltage level is pulled down from 0.8 V to 0.5 V and thus not greater than the voltage threshold.

In some exemplary embodiments, as shown in FIG. 1, similar to the first terminal impedance circuit 50, the second terminal impedance circuit 150 comprises a third terminal impedance R3 and a fourth terminal impedance R4, where the third terminal impedance R3 is connected to the positive data pin D+_B, and the fourth terminal impedance R4 is connected to the negative data pin D−_B. The third terminal impedance R3 and the fourth terminal impedance R4 may be formed by passive elements (such as resistors, capacitors, inductors). Preferably, in some embodiments, the third terminal impedance R3 and the fourth terminal impedance R4 are both implemented by using resistors. For example, the third terminal impedance R3 and the fourth terminal impedance R4 are both 45Ω resistors. In some exemplary embodiments, the first terminal impedance R1, the second terminal impedance R2, the third terminal impedance R3, and the fourth terminal impedance R4 are all implemented by using resistors having identical resistances.

Figure 4:
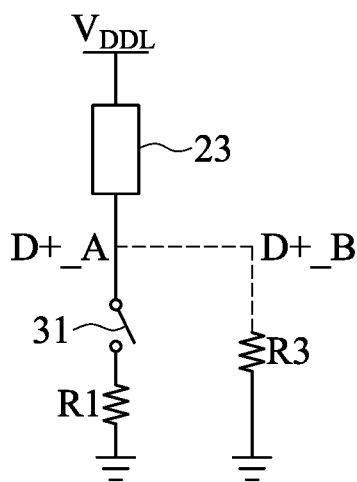
FIG. 4 illustrates a schematic application diagram of a second transceiver circuit according to some exemplary embodiments of the instant disclosure.

FIG. 4 illustrates a schematic application diagram of the second transceiver circuit 23 according to some exemplary embodiments of the instant disclosure. For illustrative purposes, FIG. 4 only shows the positive data pin D+_A and circuits related thereto (such as the first switch 31 and the first terminal impedance R1) as well as the positive data pin D+_B and circuits related thereto (such as the third terminal impedance R3). According to FIG. 4, during the high-speed handshake stage T4, when the control circuit 40 is about to enter the high-speed transmission stage T5, the second transceiver circuit 23 is connected to the third terminal impedance R3, and thus the second voltage level of the second voltage signal transmitted via the positive data pin D+_A of the second transceiver circuit 23 is pulled down by the third terminal impedance R3 to be not greater than the voltage threshold.

Figure 5:
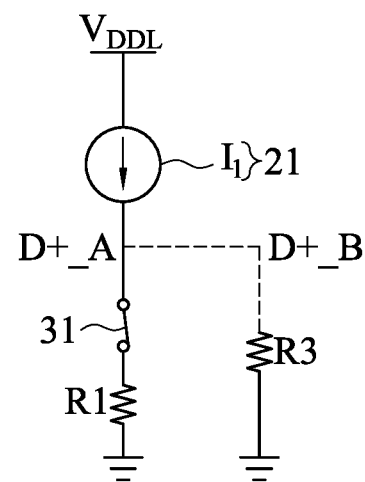
FIG. 5 illustrates a schematic application diagram of a first transceiver circuit according to some exemplary embodiments of the instant disclosure.

FIG. 5 illustrates a schematic application diagram of the first transceiver circuit 21 according to some exemplary embodiments of the instant disclosure. For illustrative purposes, FIG. 5 only shows the positive data pin D+_A and circuits related thereto (such as the first switch 31 and the first terminal impedance R1) as well as the positive data pin D+_B and circuits related thereto (such as the third terminal impedance R3). In some exemplary embodiments, the first transceiver circuit 21 is a current-driven transceiver circuit. In order to keep the instant disclosure brief, the description here focuses on the first voltage signal at the positive data pin D+_A. As shown in FIG. 5, the first transceiver circuit 21 has a current source $I_1$ and is driven by the current source $I_1$. The current value of the current source $I_1$ may be 17.78 mA. During the high-speed transmission stage T5, the second terminal impedance circuit 150 is shunted with the first terminal impedance circuit 50 (in other words, in this embodiment, the third terminal impedance R3 is shunted with the first terminal impedance R1). Assuming that the third terminal impedance R3 and the first terminal impedance R1 are both 45Ω resistors, during the high-speed transmission stage T5, the first transceiver circuit 21 transmits the first voltage signal having the first voltage level of 0.4 V based on the current source $I_1$, the first terminal impedance R1, and the third terminal impedance R3. As a result, the first voltage level can conform to the regulated voltage related to the positive data pin D+_A and the negative data pin D−_A during the high-speed transmission stage T5 according to the USB 2.0 specification. In some exemplary embodiments, the current source $I_1$ may be implemented by using internal circuitry.

Please refer back to FIG. 4. In some exemplary embodiments, the second transceiver circuit 23 is a voltage-driven transceiver circuit. In order to keep the instant disclosure brief, the description here focuses on the second voltage signal at the positive data pin D+_A. Because of some manufacturing factors, a voltage value of an operation voltage $V_{DDL}$ is limited. For example, the voltage value of the operation voltage $V_{DDL}$ may be limited at 0.8 V. The regulated voltage related to the positive data pin D+_A and the negative data pin D−_A during the high-speed transmission stage T5 according to the USB 2.0 specification is 0.8 V. Because some circuit designs may consume extra power and thus lower the operation voltage, in order to allow the second voltage level to conform to the specification without increased operation voltage $V_{DDL}$, the second transceiver circuit 23 may be designed to generate zero or close-to-zero voltage drop, so that the second voltage level of the second voltage signal of the second transceiver circuit 23 can conform to the regulated voltage. For example, compared with current-driven transceiver circuits, voltage-driven transceiver circuits are less likely to generate voltage drops.

As shown in FIG. 4, the second transceiver circuit 23 is driven by the operation voltage $V_{DDL}$. In some exemplary embodiments, the second transceiver circuit 23 may be formed by an inverter and a transistor adapted to assist the inverter (described as an auxiliary transistor hereinafter). Because the inverter and the auxiliary transistor are able to generate zero or close-to-zero voltage drop, the second transceiver circuit 23 can transmit the operation voltage $V_{DDL}$ as the second voltage signal to the positive data pin D+_A (because during the high-speed handshake stage T4, the pull-up resistor $R_{pu}$ is not disconnected from the positive data pin D+_B, and the first terminal impedance R1 is disconnected from the positive data pin D+_A). As a result, the second voltage level can conform to the regulated voltage related to the positive data pin D+_A and the negative data pin D−_A during the high-speed handshake stage T4 according to the USB 2.0 specification.

Figure 6:
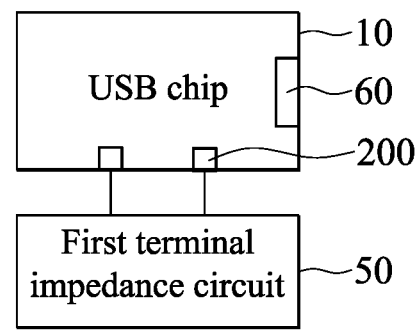
FIG. 6 illustrates a schematic diagram of a USB chip according to some exemplary embodiments of the instant disclosure.

FIG. 6 illustrates a schematic diagram of the USB chip 10 according to some exemplary embodiments of the instant disclosure. Please refer to FIG. 6. In some exemplary embodiments, as shown in FIG. 1, the first terminal impedance circuit 50 is inside the USB chip 10. In some other exemplary embodiments, as shown in FIG. 6, the first terminal impedance circuit 50 is outside the USB chip 10, and the USB chip 10 further comprises a connection end 200 so as to be connected to the first terminal impedance circuit 50. In other words, in these embodiments, the connection end 200 and the connector 60 are both I/O ports of the USB chip 10.

To summarize the above, according to some exemplary embodiments, through the two transceiver circuits transmitting signals having different voltage levels, the voltage level can conform to the regulated voltage without increased operation voltage during the high-speed handshake stage and the high-speed transmission stage. In some exemplary embodiments, because additional elements (such as an LDO) for increasing the operation voltage are not necessarily required, usable space for circuit design can be increased. For example, according to some exemplary embodiments of this instant disclosure, not only the overall power consumption of the USB chip can be reduced, but also the usable space for circuit design can be increased.

What is claimed is:
1. A USB (universal serial bus) chip comprising:
   a positive data pin;
   a negative data pin;
   a first transceiver circuit configured to transmit a first voltage signal via the positive data pin and the negative data pin alternately when the first transceiver circuit is actuated;
   a second transceiver circuit configured to transmit a second voltage signal via the positive data pin and the negative data pin alternately when the second transceiver circuit is actuated, wherein a second voltage level of the second voltage signal is greater than a first voltage level of the first voltage signal;
   a switching circuit configured to connect the positive data pin and the negative data pin with a first terminal impedance circuit in a first state and to disconnect the positive data pin and the negative data pin from the first terminal impedance circuit in a second state; and
   a control circuit configured to
      control the switching circuit to be in the second state during a high-speed handshake stage;
      actuate the second transceiver circuit when the switching circuit is controlled to be in the second state;
      control the switching circuit to be in the first state during a high-speed transmission stage; and
      actuate the first transceiver circuit when the switching circuit is controlled to be in the first state.
2. The USB chip according to claim 1, wherein the control circuit generates a switching stage signal so as to determine whether the control circuit is in the high-speed handshake stage or the high-speed transmission stage.

3. The USB chip according to claim 2, wherein when a third voltage signal from a USB sub device exists at the negative data pin, the control circuit generates the switching stage signal indicating the high-speed handshake stage and operates in the high-speed handshake stage.

4. The USB chip according to claim 3, wherein on the condition that a duration time of the third voltage signal is less than a time threshold, the control circuit further generates the switching stage signal indicating the high-speed handshake stage.

5. The USB chip according to claim 2, wherein when a number of times of the second voltage signal being transmitted via the positive data pin is not less than a threshold of a number of times and the number of times of the second voltage signal being transmitted via the negative data pin is not less than the threshold of the number of times, the control circuit generates the switching stage signal indicating the high-speed transmission stage and operates in the high-speed transmission stage.

6. The USB chip according to claim 2, further comprising a detection circuit connected to the control circuit, the positive data pin, and the negative date pin, wherein the detection circuit is configured to detect the second voltage level of the second voltage signal at the positive data pin and the second voltage level of the second voltage signal at the negative data pin; and
when the second voltage level is not greater than a voltage threshold, the control circuit generates the switching stage signal indicating the high-speed transmission stage and operates in the high-speed transmission stage.

7. The USB chip according to claim 6, wherein the second voltage level of the second voltage signal at the positive data pin and the second voltage level of the second voltage signal at the negative data pin are pulled down to be not greater than the voltage threshold by a second terminal impedance circuit of a USB sub device.

8. The USB chip according to claim 1, wherein the first transceiver circuit is a current-driven transceiver circuit, and the second transceiver circuit is a voltage-driven transceiver circuit.

9. The USB chip according to claim 1, wherein when the switching circuit is controlled to be in the first state, the control circuit also disables the second transceiver circuit.

10. The USB chip according to claim 1, wherein when the switching circuit is controlled to be in the second state, the control circuit also disables the first transceiver circuit.

11. The USB chip according to claim 1, wherein the first terminal impedance circuit is inside the USB chip.

12. The USB chip according to claim 1, wherein the first terminal impedance circuit is outside the USB chip, and the USB chip further comprises a connection end so as to be connected to the first terminal impedance circuit.

13. An operation method of a USB chip, wherein the USB chip comprises a positive data pin, a negative data pin, a first transceiver circuit, a second transceiver circuit, a switching circuit, and a control circuit; and the operation method comprises:
controlling, through the control circuit, the switching circuit to be in a second state during a high-speed handshake stage;
actuating the second transceiver circuit when the switching circuit is controlled to be in the second state;
controlling the switching circuit to be in a first state through the control circuit during a high-speed transmission stage; and
actuating the first transceiver circuit when the switching circuit is controlled to be in the first state;
wherein the switching circuit is configured to connect the positive data pin and the negative data pin with a first terminal impedance circuit in the first state and disconnect the positive data pin and the negative data pin from the first terminal impedance circuit in the second state;
when the first transceiver circuit is actuated, the first transceiver circuit alternately transmits a first voltage signal via the positive data pin and the negative data pin alternately; when the second transceiver circuit is actuated, the second transceiver circuit alternately transmits a second voltage signal via the positive data pin and the negative data pin alternately; and
wherein a second voltage level of the second voltage signal is greater than a first voltage level of the first voltage signal.

14. The operation method of a USB chip according to claim 13, further comprising generating a switching stage signal through the control circuit so as to determine whether the control circuit is in the high-speed handshake stage or the high-speed transmission stage.

15. The operation method of a USB chip according to claim 14, wherein the generating the switching stage signal through the control circuit comprises: when a third voltage signal from a USB sub device exists at the negative data pin, the control circuit generates the switching stage signal indicating the high-speed handshake stage and operating at the high-speed handshake stage.

16. The operation method of a USB chip according to claim 15, wherein the switching stage signal indicating the high-speed handshake stage is further generated when a duration time of the third voltage signal is less than a time threshold.

17. The operation method of a USB chip according to claim 14, wherein when a number of times of the second voltage signal being transmitted via the positive data pin is not less than a number of times threshold and the number of times of the second voltage signal being transmitted via the negative data pin is not less than the number of times threshold, the control circuit generates the switching stage signal indicating the high-speed transmission stage and operates in the high-speed transmission stage.

18. The operation method of a USB chip according to claim 14, wherein the USB chip further comprises a detection circuit connected to the control circuit, and the detection circuit is configured to detect the second voltage level of the second voltage signal at the positive data pin and the second voltage level of the second voltage signal at the negative data pin; and
when the second voltage level is not greater than a voltage threshold, the control circuit generates the switching stage signal indicating the high-speed transmission stage and operates in the high-speed transmission stage.

19. The operation method of a USB chip according to claim 18, wherein the second voltage level of the second voltage signal at the positive data pin and the second voltage level of the second voltage signal at the negative data pin are pulled down to be not greater than the voltage threshold by a second terminal impedance circuit of a USB sub device.

20. The operation method of a USB chip according to claim 13, wherein the first transceiver circuit is a current-driven transceiver circuit, and the second transceiver circuit is a voltage-driven transceiver circuit.

* * * * *